O. A. KELLY
GOVERNOR.
No. 62,853. Patented Mar. 12, 1867.
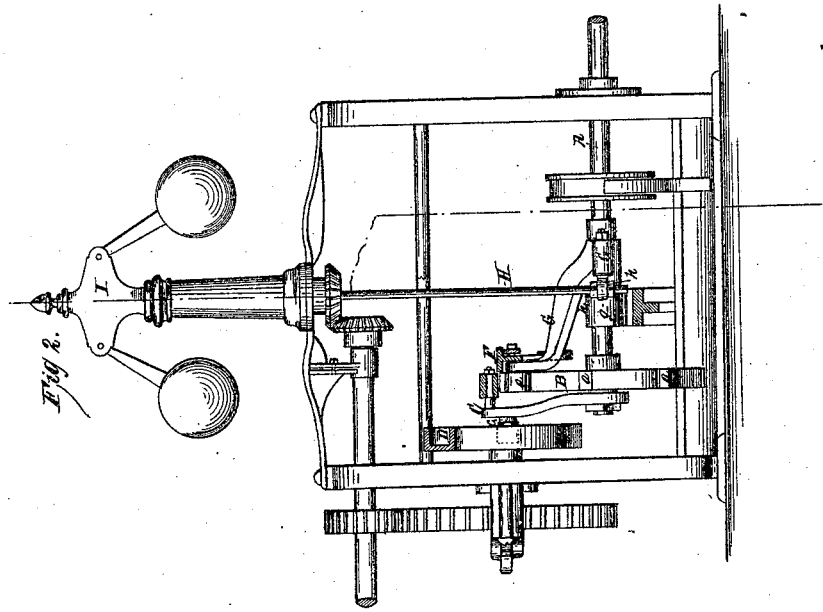
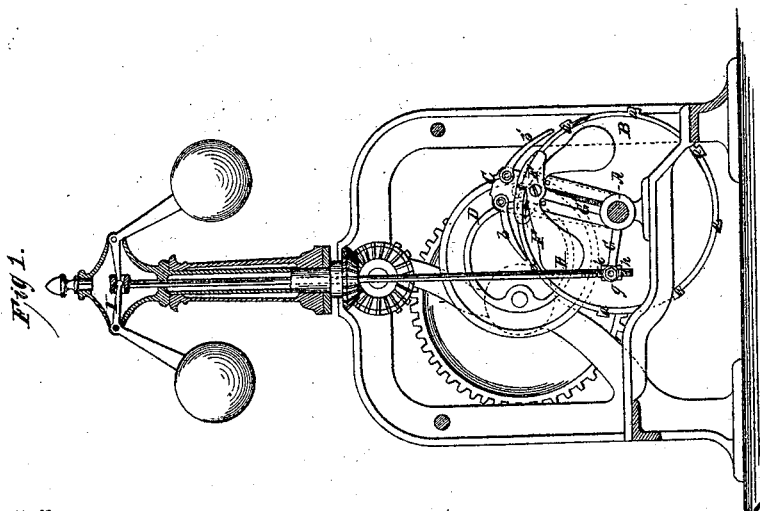
Witnesses.
Inventor
Oliver A Kelly
Per Munn & Co
Attorneys

United States Patent Office.

OLIVER A. KELLY, OF SLATERSVILLE, RHODE ISLAND, ASSIGNOR TO LAMB, COOK & CO.

*Letters Patent No. 62,853, dated March 12, 1867.*

---

IMPROVEMENT IN GOVERNORS.

---

*The Schedule referred to in these Letters Patent and making part of the same.*

---

TO ALL WHOM IT MAY CONCERN:

Be it known that I, OLIVER A. KELLY, of Slatersville, in the county of Providence, and State of Rhode Island, have invented a new and improved Governor for Water-Wheels, &c.; and I do hereby declare that the following is a full, clear, and exact description thereof, which will enable those skilled in the art to make and use the same, reference being had to the accompanying drawings, forming part of this specification, in which—

Figure 1 represents a transverse vertical section of this invention, the line $x\ x$, fig. 2, indicating the plane of section.

Figure 2 is a sectional side elevation of the same.

Similar letters of reference indicate corresponding parts.

This invention relates to a governor in which the position of the gate or valve is regulated by the action of two pawls and a ratchet gear. The pawls point in opposite directions, and they are pivoted to an arm to which an oscillating motion is imparted, whereby the pawls are caused to sweep back and forth over the circumference of the ratchet gear. This gear is provided with dove-tailed teeth, which allow the pawls to engage with them in either direction; but if the mechanism runs at its mean or normal speed, the teeth of the ratchet gear are protected by hinged shoes, so that the pawls are not allowed to engage with them. Said shoes are pivoted to one arm of an elbow-lever, the other arm of which connects with the ball governor. If the balls of this governor rise or fly out from their mean position, the shoes are brought in such a position that they allow one of the pawls to engage with the ratchet-gear and to turn the same in one direction, whereby the gate or valve is closed; and if the speed of the mechanism diminishes, and the balls of the governor sink down below their mean position, the position of the shoes is changed, and the ratchet gear is turned in the opposite direction, whereby the gate or valve is opened. The shoes are hinged to the elbow-lever, so that the pawls, on passing over their ends and striking in the dove-tailed teeth, will not exert a pressure on the elbow-lever, and the motion of the governor balls will not be disturbed from this cause.

A represents a shaft, which connects by a chain or any other suitable mechanism with the gate or valve which regulates the supply of water to a water-wheel. On this shaft is mounted the ratchet gear B, which is provided with dove-tailed teeth $a$; and an arm, C, swings freely on the end of said shaft close to the ratchet-wheel. To the end of this arm are hinged two pawls $b\ b'$, which point in opposite directions, and a roller-stud, $c$, which projects from the outer surface of the arm C, engages with a cam-groove, D, which is cut in a disk mounted on the end of a shaft, E, to which a revolving motion is imparted by the action of the water-wheel the speed of which is to be regulated. By the cam-groove D a vibrating motion is imparted to the arm C, and the pawls $b\ b'$ are caused to sweep back and forth over the periphery of the ratchet-wheel B. If the water-wheel runs at its normal speed, the teeth of the ratchet-wheel B are protected by two shoes F, so that the pawls $b\ b'$, on sweeping over the periphery of the ratchet-wheel B, are not permitted to engage with the dove-tailed teeth $a$ in either direction. The shaft A therefore remains stationary; and the position of the gate or valve is not disturbed. Said shoes are hinged to one arm of an elbow-lever, G, which oscillates freely on the shaft A, and the other arm of which connects by a screw-rod, H, with the short arms $f$ of the ball governor I, the bottom end of said rod being provided with a screw-thread, which passes freely through the eye of an eye-bolt, $g$, and is fastened to the same by two nuts $h$, said eye-bolt being made to swivel in the end of the elbow-lever G, so that it accommodates itself to the varying position of the screw-rod H in relation to the elbow-lever. By means of the nuts $h$ the position of the elbow-lever and of the shoes is so adjusted that said shoes will prevent the pawls $b\ b'$ from engaging with the teeth of the ratchet-wheel in either direction, whenever the governor balls are half way up, or when the water-wheel runs at its mean velocity. If the velocity of the wheel increases, the balls fly out, and the shoes are caused to move in the direction of the arrow marked on it in fig. 1. By this motion said shoes are brought in such a position that the pawl $b'$ acts on the teeth of the ratchet-wheel, and turns the same in the direction of the arrow marked on it in fig. 1, whereby the gate or valve is gradually closed. As the speed of the wheel decreases the shoes return to their original position, and if the balls sink down below their mean position the shoes are brought in such a position that the pawl $b$ engages with the teeth of the ratchet-wheel, whereby the same is turned in the direction opposite the arrow marked thereon in fig. 1, and the gate or valve is opened. As the points of the pawls strike in the dove-tailed teeth of the ratchet-wheel they are slightly depressed; and in order to avoid a reaction on the elbow-lever and on the governor balls, the shoes are connected to said elbow-lever by a pivot, $i$; and weights $j$, at their tails, keep the same up in working position, allowing them to yield, however, as the pawls strike the teeth.

By these means a governor is obtained which operates sure and with comparatively little friction, and which will regulate the speed of a water-wheel with the greatest nicety.

I am aware of the patent to O. A. Kelly and E. Lamb, of January 31, 1865. I do not claim anything set forth in the said patent.

What I claim as new, and desire to secure by Letters Patent, is—

1. The weighted shoes F, in combination with the elbow-lever G, shaft A, rod H, and governor I, substantially as described, for the purpose specified.

2. The cam-groove D, in combination with the arm C, pawls $b\ b'$, ratchet gear B, shoes F, lever G, rod H, and governor I, constructed and operating substantially as and for the purpose described.

3. The yielding or self-adjusting shoes F, in combination with the pawls $b\ b'$, dove-tailed teeth $a$ of the ratchet-wheel B, lever G, rod H, and governor I, all constructed and operating substantially as and for the purpose set forth.

OLIVER A. KELLY.

Witnesses:
 ARTHUR YOUNG,
 WM. SANDFORD.